Figure 1:
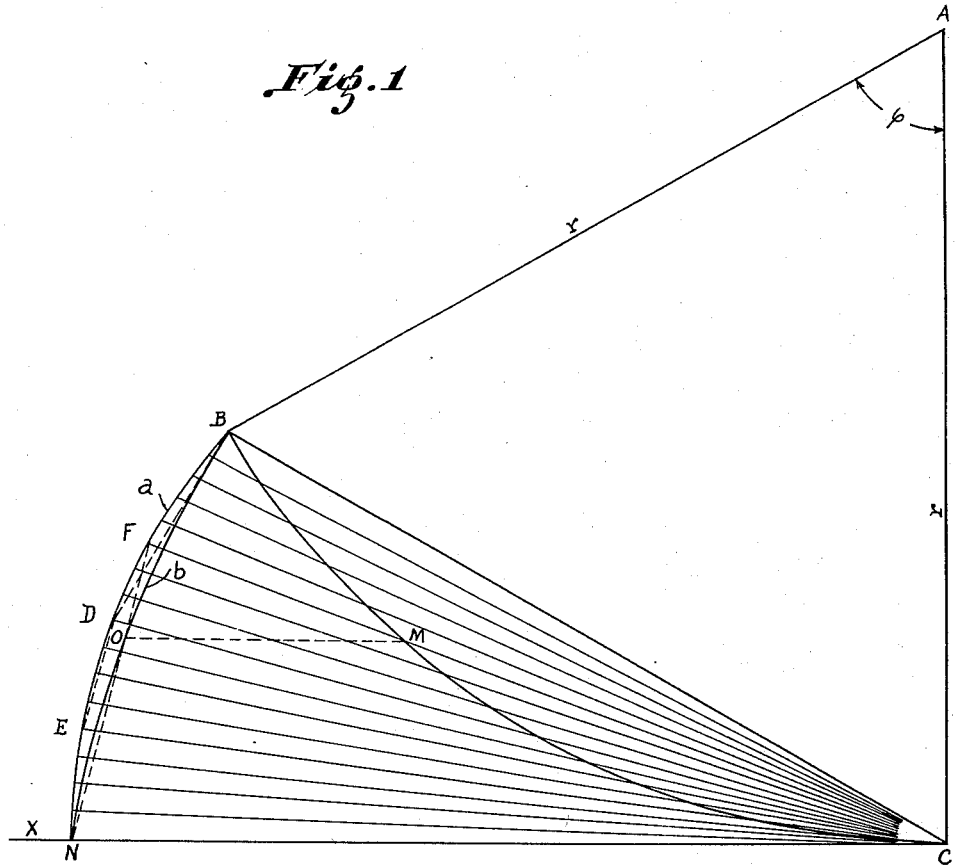

March 27, 1951  G. BURCKHARDT  2,546,885
DEVICE FOR MEASURING, OR TRACING AND DIVIDING ANGLES
Filed Aug. 25, 1947  2 Sheets-Sheet 1

Inventor:
GUNTHER BURCKHARDT
BY
Attorney

March 27, 1951 G. BURCKHARDT 2,546,885
DEVICE FOR MEASURING, OR TRACING AND DIVIDING ANGLES
Filed Aug. 25, 1947 2 Sheets-Sheet 2
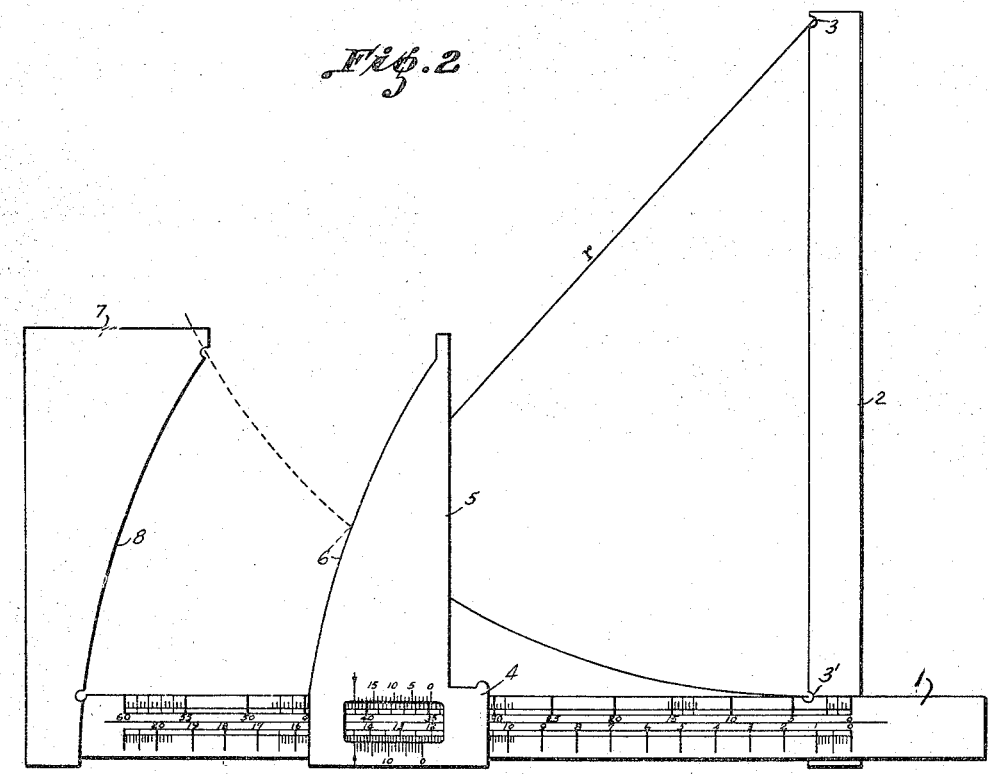
Fig. 2
Inventor:
GUNTHER BURCKHARDT
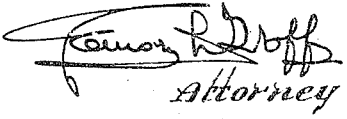
Attorney Patented Mar. 27, 1951

2,546,885

UNITED STATES PATENT OFFICE 2,546,885

DEVICE FOR MEASURING, OR TRACING AND DIVIDING ANGLES

Günther Burckhardt, Chos-Malal, Argentina

Application August 25, 1947, Serial No. 770,462

3 Claims. (Cl. 33—1)

The present invention refers to a device the main object of which is to measure or trace angles and to rectify the arcs of curves.

The device in question has been put into practice as a function of a certain angle and of a pre-established radius, for example, a 60-degree angle and a 20-centimetre radius, it being possible to effect the following operations therewith:

(1) To read immediately the value of any angle between 0 and 60 degrees, with a precision of 1 minute, and the length of the arc corresponding to a 20-centimetre radius.

(2) To rectify at once the corresponding arc.

(3) To divide the arc in the same proportion according to which the rectified arc is divided.

(4) To divide also angles of more than 60°.

It should be noted that so far no device is known for dividing angles according to any ratio so easily and precisely.

The device of the following description comprises a rule graduated according to a scale of angular and linear units, in order to measure the angle and the length of the rectified arc.

A runner, slidably adjusted on said graduated rule and also graduated, forms integral part of a plate provided with a curved edge, the curvature of which is a common cycloid, i. e., a curve followed by point B if arc BC is made to roll over straight line NC without sliding (see Fig. 2, curve $b$).

In turn, the graduated ruler forms integral part of a small upright rule, placed at right angles to same and provided with marks corresponding to the length of the radii of the curve to be rectified.

In order that the invention may be more easily understood, same will now be described with reference to attached drawings, in which:

Figure 1 shows the graphic procedure by which the curve, corresponding to the plate that forms part of the runner, is obtained, and Figure 2 illustrates the device referred to herein.

Like numerals represent like parts throughout the several figures of the drawings.

In accordance with this invention, the geometrical solution to the problem of rectifying the arc corresponding to any angle is based on a curve $a$ as per the following equations:

$$x = C(1 - \cos \varphi)$$

$$y = C\left(\frac{\pi}{180}\varphi - \sin \varphi\right)$$

In the above equations, C is a constant equal to $r.\varphi$, $r$ being the radius and $\varphi$ the angle.

The constant can be chosen suitably and, in order to illustrate the present case, an angle $\varphi = 60°$ and a radius $r = 20$ centimeters are taken, giving a constant $C = 1200$.

The geometrical construction of curve $a$ is effected as follows:

An angle $$\overset{\star}{BAC} = \varphi = 60°$$

is drawn with a radius $r = 20$ centimeters and, from point C, tangent $\overline{CX}$ of the respective arc.

From B a straight line is drawn, forming an angle of 90° with the chord of $\overline{BC}$, and from C the bisector of angle $$\overset{\star}{BCN}$$

cutting above mentioned straight line at point D, which is one point of the curve sought for.

From point D another straight line is traced, forming a 90°-angle with bisector $\overline{CD}$, the intersection of said straight line with the bisector of angle $$\overset{\star}{DCN}$$

i. e. point E, is another point of the curve to be plotted.

Continuing this procedure, the tangent of the curve is fixed, intersecting line $\overline{CX}$ at point N, distance $\overline{CN}$ being equal to the length of the arc of angle $\varphi = 60°$ with radius $r = 20$ centimeters, i. e., more exactly, 20.94395 . . . centimeters.

In order to plot curve $o$ with greater precision, the arc of angle $\varphi$ can be divided in, for example, 8, 16, 32 or more equal parts, secant lines, corresponding to each one of the dividing points of the arc, being drawn from point C.

The arc cuts these secant lines in the same proportion with regard to point C as the secant lines cut the arc, it being therefore merely necessary to complete same proportionately in order to obtain the final points corresponding to the curve sought for.

Once curve $a$ has been traced, curve $b$ is easily plotted, this curve corresponds to the curved edge of the plate forming part of the runner.

In order to plot curve $b$, the following procedure is adopted:

From point N, straight lines are drawn, such as NF, leading to all of the intersections of the secant with curve $a$, and from the points of contact of said secants with the arc corresponding to angle $\varphi$, lines parallel to tangent $\overline{CX}$ are traced such as, for example, $\overline{MO}$, said lines cutting those drawn from N, at points which correspond to curve b.

This curve is given by the following equations:

$$x = r(1 - \cos \varphi)$$

$$y = r(0.017453 \ldots \varphi - \sin \varphi) = \text{arc } \varphi - r.\sin \varphi$$

By means of this curve the arc of angle $\varphi$ can be divided according to any ratio in which it is desired to divide line $\overline{CN}$, to that end, it is only necessary to translate said curve, in a parallel manner to the dividing point of said straight line.

The preceding considerations justify the features claimed for the present invention which comprises mainly a rule 1, provided with a scale of degrees and centimeters, having at one of its ends a ruler 2, indications 3 and 3' of which are separated by a distance which is equal to the radius r of the arc that has been adopted as the basis for measurement.

Slidably mounted on said rule 1, a runner 4 has been arranged, also graduated into centimetres and degrees, in the manner of a nonius or vernier, a plate 5 forming integral part thereof and having a curved edge 6, the shape of which has been determined by the previously explained analytic or graphic method.

Rule 1, at the end opposite to that corresponding to ruler 2, is equipped with a plate 7 edge 8 of which, adjacent to the curved edge of plate 5, has the same curvature as this latter edge.

Where the angles exceed 60° the device is applied only to angles exceeding 60°, 120° etc. and obtained by subtracting from the total angles by means of the same device angles of 60°, 120° and adding the entire rectified arc in one straight line. This line is thus divided in the desired proportion in order afterwards to apply the result to the arc with the aid of the same device.

In certain cases it may be simpler to divide first the angle in excess of 60° into two, four or eight equal parts so as to obtain an angle less than 60°, thereafter applying the device to this last angle in the manner described above.

By means of the device thus described, it is possible to divide any angle in $n$ equal parts, or according to any other ratio or proportion, and at the same time to determine any one of these angles with a precision of one minute, it being necessary only, to this end, that the device be constructed with care and exactness.

Furthermore, although the device has been designed for an arc with a definite radius, same may be used to determine the different angles, or to divide them according to any ratio or proportion, of arcs of a different radius, for which purpose all that is required is to draw same concentrically with respect to the arc corresponding to the radius that has served as a basis for the construction of the device object of this invention.

In such a case, it is not possible to read directly on the scale the length of the rectified arc, but as the length of the different arcs is directly proportional to the corresponding radii, it is an easy matter to determine the arc subject to measurement.

The device provides a means for rectifying, in the most simple manner, the arc of any angle having a 20-centimetre radius, no calculations being necessary for this operation, inasmuch as the exact length of the arc can be read off the millimetre scale (or the scale in inches, as the case may be).

In the same manner, it is possible to read on the degree scale, the value corresponding to each angle, with a 1-minute precision thereof.

Furthermore, without any calculations whatsoever, any angle can be divided into equal parts, or proportionately as desired, to accomplish this, it is only necessary to divide accordingly the straight line corresponding to the arc of the angle in question, and the slider with which the device is equipped, automatically protracts or transfers the divisor-point to the arc.

The invention, doubtlessly, will render excellent services in technical drafting, in cases such as, for example:

When drawing gears having a certain number of teeth, calculations being unnecessary when employing the device according to this invention.

When drawing the linear progress of a wheel, as corresponding to a whole turn, or to a fraction of a turn.

To establish, by means of a drawing, the linear length of curved railway lines or rails.

To divide angles according to a given ratio.

The device, furthermore, is useful for precision protracting in survey operations.

Evidently, the invention may be modified as to its construction and details, without thereby departing from its essential nature, as clearly defined in the following claims.

I claim:

1. A device for measuring or tracing and dividing angles as well as rectifying the arc of curves comprising a graduated rule, a runner slidable on the rule, a second rule fixed at right angles to and at one end of the first rule and of predetermined length, a plate fixed to the opposite end of the first rule and having a straight outer edge including a right angle therewith and a curved inner concave edge forming a cycloid traced by the end point of a curve, a plate affixed to the runner and having an outer concave edge forming a cycloid parallel to the first cycloid.

2. A device according to claim 1 and wherein the runner is provided with an opening having a vernier scale confronting the graduations of the first rule.

3. The device according to claim 1 and wherein the rule fixed at right angles to the end of the first rule and the concave edge of the fixed plate are each provided with marks indicating the ends of the radius and of the curve respectively.

GÜNTHER BURCKHARDT.

REFERENCES CITED

The following references are of record in the file of this patent:

UNITED STATES PATENTS

| Number | Name | Date |
|---|---|---|
| 115,318 | Hickman | May 30, 1871 |
| 992,371 | Mather | May 16, 1911 |
| 1,764,581 | Shibuyo | June 17, 1930 |
| 1,902,989 | Bray | Mar. 28, 1933 |

FOREIGN PATENTS

| Number | Country | Date |
|---|---|---|
| 316,726 | Germany | Dec. 3, 1919 |